(12) United States Patent
Swanson et al.

(10) Patent No.: US 6,392,577 B1
(45) Date of Patent: May 21, 2002

(54) SYSTEM AND METHOD FOR REGULATING AN ALTERNATOR

(75) Inventors: David F. Swanson, Howell, MI (US); Mauro Merlo, Pavia; Franco Cocetta, Premariacco Udine, both of (IT)

(73) Assignees: STMicroelectronics, Inc., Carrollton, TX (US); STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/412,534

(22) Filed: Oct. 5, 1999

(51) Int. Cl.[7] ............................................. H03M 1/66
(52) U.S. Cl. ...................................... 341/144; 323/263
(58) Field of Search ............................. 341/144, 155; 322/25; 324/434, 433; 320/15, 19, 39, 22, 32, 14; 363/17, 41, 98

(56) References Cited

U.S. PATENT DOCUMENTS

| | | | |
|---|---|---|---|
| 4,659,977 A | 4/1987 | Kissel et al. ................. 320/64 |
| 4,791,348 A * | 12/1988 | McGuire et al. ............. 323/263 |
| 5,038,728 A | 8/1991 | Yoshida et al. ............. 123/198 |
| 5,080,059 A | 1/1992 | Yoshida et al. ............. 123/198 |
| 5,298,851 A | 3/1994 | DeNardis ...................... 322/28 |
| 5,521,485 A * | 5/1996 | Vogelsberger ................ 322/28 |
| 5,589,757 A | 12/1996 | Klang .......................... 320/22 |
| 5,610,499 A | 3/1997 | Rogers ......................... 322/25 |
| 6,208,127 B1 * | 3/2001 | Doluca ........................ 323/349 |

* cited by examiner

*Primary Examiner*—Peguy Jeanpierre
*Assistant Examiner*—Joseph Lauture
(74) *Attorney, Agent, or Firm*—Lisa K. Jorgenson; Christopher F. Regan (57) ABSTRACT

A system and method regulates an alternator and includes a circuit for digitally generating a sawtooth waveform. An error amplifier circuit generates a divided down and error amplified alternator system voltage. A comparator circuit receives and compares to each other the digitally generated sawtooth waveform and the error amplified alternator system voltage and has an output to produce an alternator field input signal used for driving the field of an alternator.

20 Claims, 7 Drawing Sheets

State A

| Node | 1 | 2 | 3 | 4 | 5 | 6 | 7 | 8 | 9 | 10 | 11 | 12 | 13 | 14 | 15 | 16 | 17 | 18 | 19 | 20 | 21 | ... | 256 | Units |
|---|---|---|---|---|---|---|---|---|---|---|---|---|---|---|---|---|---|---|---|---|---|---|---|---|
| Counter A | FF | FE | FD | FC | FB | FA | F9 | F8 | F7 | F6 | F5 | F4 | F3 | F2 | F1 | F0 | EF | EE | ED | EC | EB | ... | 00 | Hex |
| Comparator B | 0 | 0 | 0 | 0 | 0 | 0 | 0-1 | 1 | 1 | 1 | 1 | 1 | 1 | 1 | 1 | 1 | 1 | 1 | 1 | 1 | 1 | ... | 1 | Binary |
| Latch C | 00 | 00 | 00 | 00 | 00 | 00 | F9 | F9 | F9 | F9 | F9 | F9 | F9 | F9 | F9 | F9 | F9 | F9 | F9 | F9 | F9 | ... | F8 | Hex |
| Dig. Comp D | 1 | 1 | 1 | 1 | 1 | 1 | 1 | 0 | 0 | 0 | 0 | 0 | 0 | 0 | 0 | 0 | 0 | 0 | 0 | 0 | 0 | ... | 0 | Binary |
| Clock E | 0 | 0 | 0 | 0 | 0 | 0 | 0 | 0 | 0 | 0 | 0 | 0 | 0 | 0 | 0 | 0 | 0 | 0 | 0 | 0 | 0 | ... | 1 | Clock |

FIG. 8.

State B

| Node | 1 | 2 | 3 | 4 | 5 | 6 | 7 | 8 | 9 | 10 | 11 | 12 | 13 | 14 | 15 | 16 | 17 | 18 | 19 | 20 | 21 | ... | 256 | Units |
|---|---|---|---|---|---|---|---|---|---|---|---|---|---|---|---|---|---|---|---|---|---|---|---|---|
| Counter A | FF | FE | FD | FC | FB | FA | F9 | F8 | F7 | F6 | F5 | F4 | F3 | F2 | F1 | F0 | EF | EE | ED | EC | EB | ... | 00 | Hex |
| Comparator B | 0 | 0 | 0 | 0 | 0 | 0 | 0 | 0 | 0 | 0-1 | 1 | 1 | 1 | 1 | 1 | 1 | 1 | 1 | 1 | 1 | 1 | ... | 1 | Binary |
| Latch C | F8 | F8 | F8 | F8 | F8 | F8 | F8 | F8 | F8 | F8 | F8 | F8 | F8 | F8 | F8 | F8 | F8 | F8 | F8 | F8 | F8 | ... | F7 | Hex |
| Dig. Comp D | 1 | 1 | 1 | 1 | 1 | 1 | 1 | 1 | 1 | 1 | 0 | 0 | 0 | 0 | 0 | 0 | 0 | 0 | 0 | 0 | 0 | ... | 0 | Binary |
| Clock E | 0 | 0 | 0 | 0 | 0 | 0 | 0 | 0 | 0 | 0 | 0 | 0 | 0 | 0 | 0 | 0 | 0 | 0 | 0 | 0 | 0 | ... | 1 | Clock |

FIG. 9.

| State C | Node | 1 | 2 | 3 | 4 | 5 | 6 | 7 | 8 | 9 | 10 | 11 | 12 | 13 | 14 | 15 | 16 | 17 | 18 | 19 | 20 | 21 | ... | 256 | Units |
|---|---|---|---|---|---|---|---|---|---|---|---|---|---|---|---|---|---|---|---|---|---|---|---|---|---|
| | Counter A | FF | FE | FD | FC | FB | FA | F9 | F8 | F7 | F6 | F5 | F4 | F3 | F2 | F1 | F0 | EF | EE | ED | EC | EB | ... | 00 | Hex |
| | Comparator B | 0 | 0 | 0 | 0 | 0 | 0 | 0 | 0 | 0 | 0-1 | 1 | 1 | 1 | 1 | 1 | 1 | 1 | 1 | 1 | 1 | 1 | ... | 1 | Binary |
| | Latch C | F7 | F7 | F7 | F7 | F7 | F7 | F7 | F7 | F7 | F7 | F7 | F7 | F7 | F7 | F7 | F7 | F7 | F7 | F7 | F7 | F7 | ... | F6 | Hex |
| | Dig. Comp D | 1 | 1 | 1 | 1 | 1 | 1 | 1 | 1 | 1 | 1 | 0 | 0 | 0 | 0 | 0 | 0 | 0 | 0 | 0 | 0 | 0 | ... | 0 | Binary |
| | Clock E | 0 | 0 | 0 | 0 | 0 | 0 | 0 | 0 | 0 | 0 | 1 | 0 | 0 | 0 | 0 | 0 | 0 | 0 | 0 | 0 | 0 | ... | 1 | Clock |

| State D | Node | 1 | 2 | 3 | 4 | 5 | 6 | 7 | 8 | 9 | 10 | 11 | 12 | 13 | 14 | 15 | 16 | 17 | 18 | 19 | 20 | 21 | ... | 256 | Units |
|---|---|---|---|---|---|---|---|---|---|---|---|---|---|---|---|---|---|---|---|---|---|---|---|---|---|
| | Counter A | FF | FE | FD | FC | FB | FA | F9 | F8 | F7 | F6 | F5 | F4 | F3 | F2 | F1 | F0 | EF | EE | ED | EC | EB | ... | 00 | Hex |
| | Comparator B | 0 | 0 | 0 | 0 | 0 | 0 | 0 | 0 | 0 | 0-1 | 1 | 1 | 1 | 1 | 1 | 1 | 1 | 1 | 1 | 1 | 1 | ... | 1 | Binary |
| | Latch C | F6 | F6 | F6 | F6 | F6 | F6 | F6 | F6 | F6 | F6 | F6 | F6 | F6 | F6 | F6 | F6 | F6 | F6 | F6 | F6 | F6 | ... | F5 | Hex |
| | Dig. Comp D | 1 | 1 | 1 | 1 | 1 | 1 | 1 | 1 | 1 | 1 | 1 | 0 | 0 | 0 | 0 | 0 | 0 | 0 | 0 | 0 | 0 | ... | 0 | Binary |
| | Clock E | 0 | 0 | 0 | 0 | 0 | 0 | 0 | 0 | 0 | 0 | 0 | 1 | 0 | 0 | 0 | 0 | 0 | 0 | 0 | 0 | 0 | ... | 1 | Clock |

FIG. 10.

| State E | Node | 1 | 2 | 3 | 4 | 5 | 6 | 7 | 8 | 9 | 10 | 11 | 12 | 13 | 14 | 15 | 16 | 17 | 18 | 19 | 20 | 21 | ... | 256 | Units |
|---|---|---|---|---|---|---|---|---|---|---|---|---|---|---|---|---|---|---|---|---|---|---|---|---|---|
| | Counter A | FF | FE | FD | FC | FB | FA | F9 | F8 | F7 | F6 | F5 | F4 | F3 | F2 | F1 | F0 | EF | EE | ED | EC | EB | ... | 00 | Hex |
| | Comparator B | 0 | 0 | 0 | 0 | 0 | 0 | 0 | 0 | 0 | 0 | 0-1 | 1 | 1 | 1 | 1 | 1 | 1 | 1 | 1 | 1 | 1 | ... | 1 | Binary |
| | Latch C | F5 | F5 | F5 | F5 | F5 | F5 | F5 | F5 | F5 | F5 | F5 | F6 | F6 | F6 | F6 | F6 | F6 | F6 | F6 | F6 | F6 | ... | F5 | Hex |
| | Dig. Comp D | 1 | 1 | 1 | 1 | 1 | 1 | 1 | 1 | 1 | 1 | 1 | 0 | 0 | 0 | 0 | 0 | 0 | 0 | 0 | 0 | 0 | ... | 0 | Binary |
| | Clock E | 0 | 0 | 0 | 0 | 0 | 0 | 0 | 0 | 0 | 0 | 0 | 1 | 0 | 0 | 0 | 0 | 0 | 0 | 0 | 0 | 0 | ... | 1 | Clock |

FIG. 11.

| State F | Node | 1 | 2 | 3 | 4 | 5 | 6 | 7 | 8 | 9 | 10 | 11 | 12 | 13 | 14 | 15 | 16 | 17 | 18 | 19 | 20 | 21 | ... | 256 | |
|---|---|---|---|---|---|---|---|---|---|---|---|---|---|---|---|---|---|---|---|---|---|---|---|---|---|
| | Counter A | FF | FE | FD | FC | FB | FA | F9 | F8 | F7 | F6 | F5 | F4 | F3 | F2 | F1 | F0 | EF | EE | ED | EC | EB | ... | 00 | Hex |
| | Comparator B | 0 | 0 | 0 | 0 | 0 | 0 | 0 | 0 | 0-1 | 1 | 1 | 1 | 1 | 1 | 1 | 1 | 1 | 1 | 1 | 1 | 1 | ... | 1 | Binary |
| | Latch C | F5 | F5 | F5 | F5 | F5 | F5 | F5 | F5 | F5 | FA | FA | FA | FA | FA | FA | FA | FA | FA | FA | FA | FA | ... | F9 | Hex |
| | Dig. Comp D | 1 | 1 | 1 | 1 | 1 | 1 | 1 | 1 | 1 | 0 | 0 | 0 | 0 | 0 | 0 | 0 | 0 | 0 | 0 | 0 | 0 | ... | 0 | Binary |
| | Clock E | 0 | 0 | 0 | 0 | 0 | 0 | 0 | 0 | 0 | 1 | 0 | 0 | 0 | 0 | 0 | 0 | 0 | 0 | 0 | 0 | 0 | ... | 1 | Clock |

US 6,392,577 B1

SYSTEM AND METHOD FOR REGULATING AN ALTERNATOR

FIELD OF THE INVENTION

This invention relates to the field of alternators, and more particularly, this invention relates to the field of regulating an alternator with a pulse width modulated waveform.

BACKGROUND OF THE INVENTION

Figure 5:
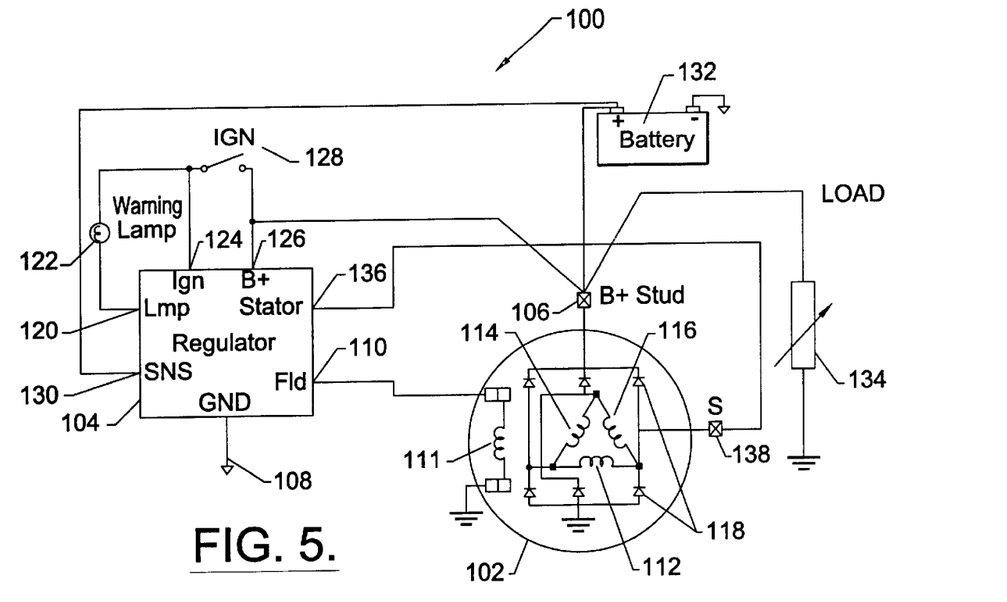
FIG. 5 is a basic schematic circuit diagram showing the operation of an automotive charging system.
Figure 5A:
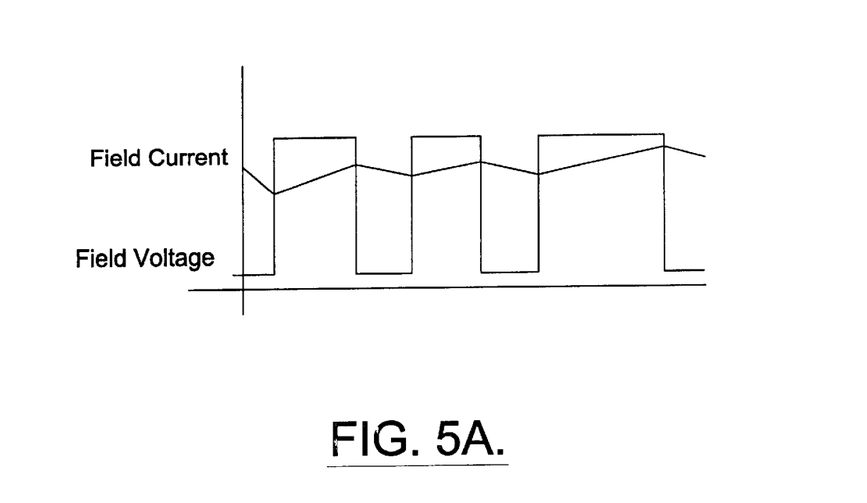
FIG. 5A is a graph showing the relation of field current and field voltage.

An alternator acts as a current mode machine that is controlled by a sensing voltage. A regulator determines the amount of field current required by monitoring the voltage at the output of the alternator, such as in the B+ stud as shown in FIG. 5. The current is regulated by means of a pulse width modulated (PWM) signal that typically has a frequency of about 200 to about 400 Hz. The current changes slowly to the changes in the field voltage as shown in FIG. 5A.

Some prior art alternator based vehicle charging systems control field current in an alternator as a function of the charging system or alternator output voltage. The field current is usually controlled by a 100 to 300 Hz pulse width modulated switch because the time constant for the field is above 300 ms. In lower engine idle revolutions per minute, it is necessary to control the load to have better emissions and mileage. Thus, increases in mechanical loads have to be managed. One mechanical load is the electrical system of the vehicle. When an electrical load is connected in a normal system, the load is translated to a mechanical load and then transferred within a few milliseconds to the engine by means of the alternator.

A The alternator field current is directly proportional to mechanical load. One type of prior art system (FIG. 1) generates a sawtooth waveform using the charging system voltage pad 20 that is input to an error amplifier 22. A capacitor 24 is operative with a triangle waveform generator 26 and inputs that generated waveform signal to a comparator 28 connected to the error amplifier 22. A field driver signal is generated at its output. Another prior art method shown in FIG. 2 uses two external capacitors 30, 32. The first capacitor 30 (C1) generates the sawtooth waveform and the second capacitor 32 (C2) is used to fool the regulation circuit by delaying any decrease in measured system voltage. A diode 34 and resistor 36 are connected in parallel to the charging system voltage pad 20 and the second capacitor 32.

Figure 1:
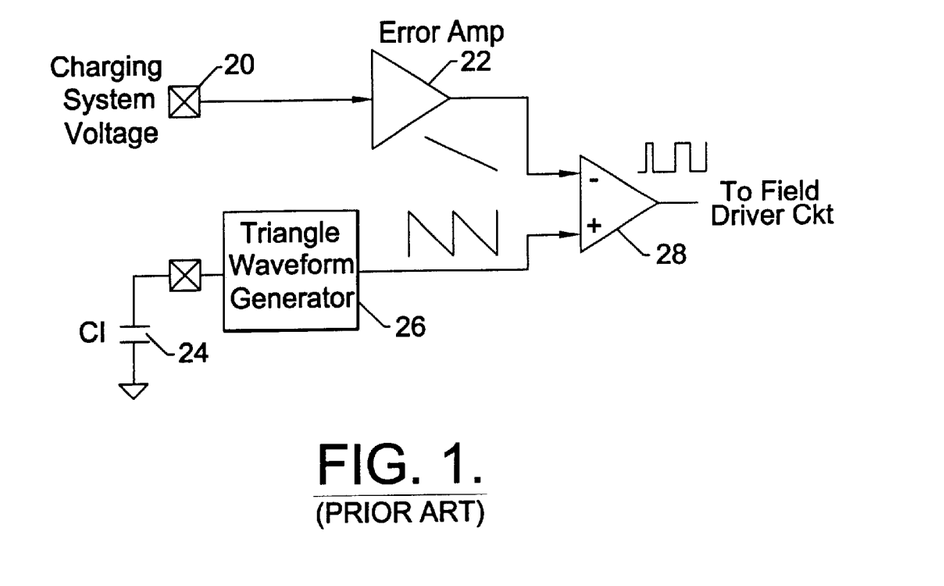
FIG. 1 is a schematic circuit diagram showing a prior art analog circuit for regulating an alternator using one capacitor and a triangle waveform generator and error amplifier.
Figure 2:
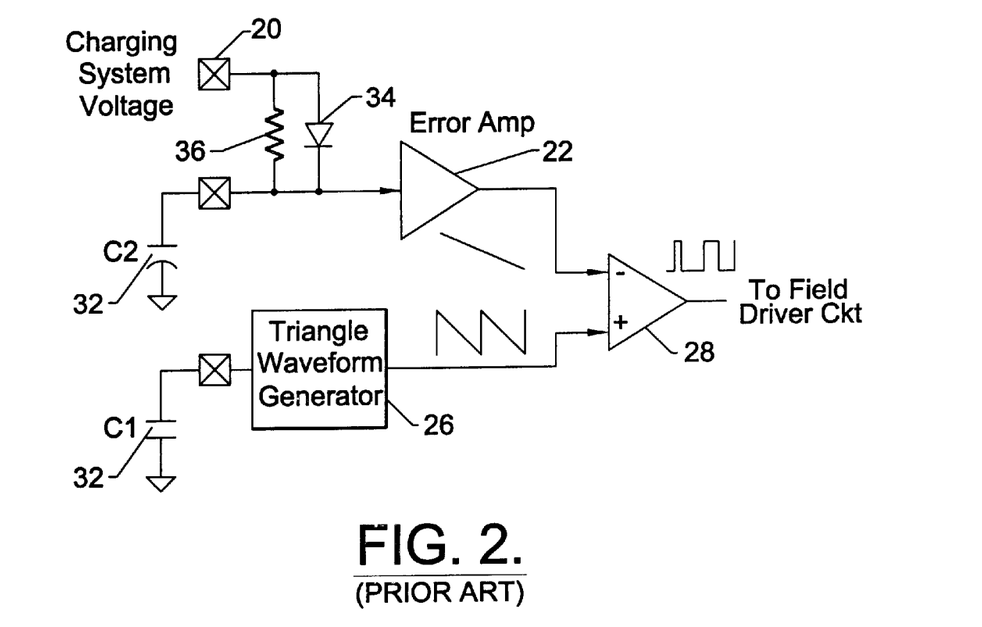
FIG. 2 is a schematic circuit diagram similar to the prior art of FIG. 1, but using two capacitors.

There are several obvious drawbacks to these prior art systems as shown in FIGS. 1 and 2. One drawback is the need for external capacitors. This use of capacitors eliminates the possibility of any solution with a monolithic semiconductor integrated circuit device. A second drawback is the resultant EMC issues. The control loop has a half wave rectifier built in with the diode 34 and capacitor 32 C2. Thus, this circuit acts similar to a charge pump on the measured system voltage.

Other prior art approaches have used digital designs. Current designs that use a digital approach have two basic differences from the analog approaches. The first difference is that the gain circuit is theoretically infinite. There is a threshold at which the field is turned on (sensed voltage below a fixed reference) or off (sensed voltage above a fixed reference). Second, the incremental loading is achieved by a duty cycle register that is incremented when the measured voltage is below the fixed reference and decremented when it is above.

Figure 3:
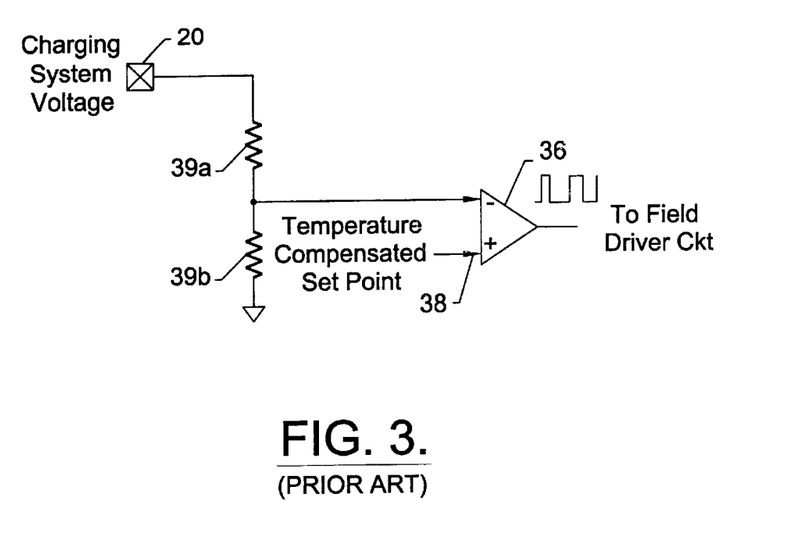
FIG. 3 is a prior art schematic circuit diagram showing a digital system for regulating an alternator using a temperature compensated set point.

One digital system used today for automotive charging systems is a simple single bit method as shown in FIG. 3. When the system voltage is below a set point, then the field driver is on. When the system voltage is above a set point, then the field driver is off. As illustrated, charging system voltage 20 is input to a comparator 36 that also receives a temperature compensated set point signal 38. Two resistors 39a, 39b provide the divider circuit for the charging system voltage signal.

A digital system does not require any external capacitor to generate a sawtooth waveform, but the field duty cycle frequency is very much system dependent. As a result, there are conditions where the system can become unstable. This instability causes many problems such as lamp flicker.

Figure 4:
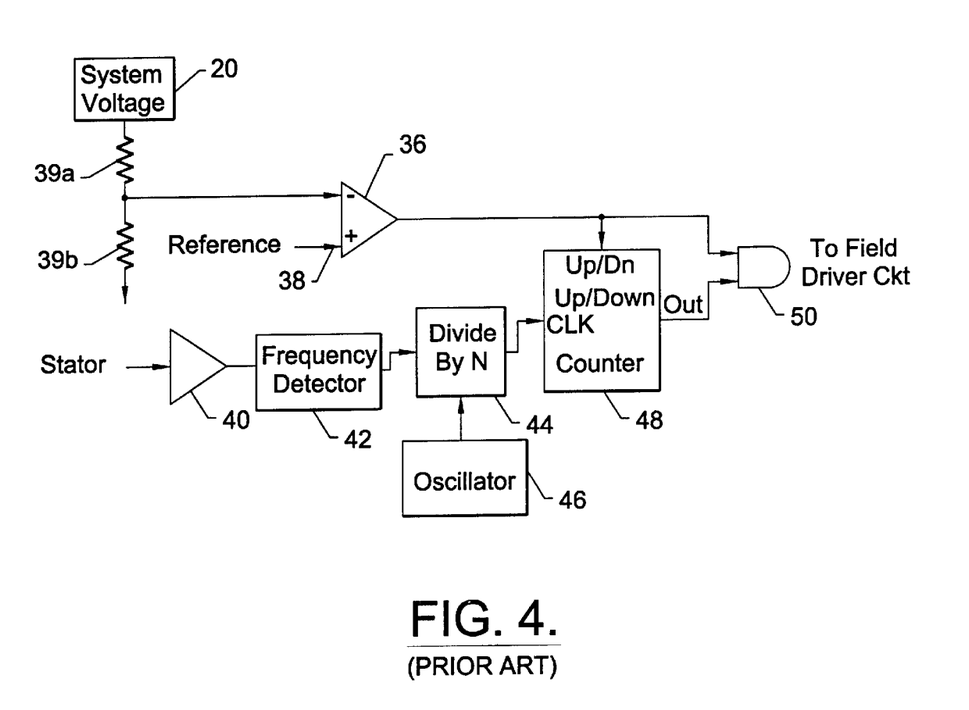
FIG. 4 is a prior art schematic circuit diagram showing a digital solution using a stator input.

To compensate for overvoltage situations when alternator loads are removed, an override circuit is implemented to shut off the field even when the duty cycle register is commanding a higher duty cycle. The rate of the incrementing or decrementing of the duty cycle register is set by a fixed rate. This fixed rate is changed at a specific alternator RPM, measured by examining one of the stator signals. Above the set RPM, the rate of change of the duty cycle register is very fast. As shown in FIG. 4, the system voltage is also divided by the resistor 39a, 39b and input into the comparator 36 that has a reference 38. However, a stator input to an amplifier 40 is then input to the frequency detector 42 and divided by N in a circuit 44 that is controlled by an oscillator 46. An up/down counter 48 produces a signal that is then input into a logic gate 50 together with the comparator output to produce the field driver signal for the alternator.

For this type of system, the duty cycle frequency can be unstable at higher loads. At the higher loads, the duty cycle frequency is better controlled by the system than by the internal oscillator. In some cases, this can generate instability that shows up in the form of lamp flickering or uneven or cyclical loading. Because of the inherent high gain of the regulation loop, the only time the duty cycle appears stable is during incremental loading increases at the lower alternator revolutions per minute.

SUMMARY OF THE INVENTION

It is therefore an object of the present invention to provide a system and method for regulating an alternator, such as part of an automotive charging system, that overcomes the disadvantages as noted above.

In accordance with the present invention, a system regulates an alternator and includes a circuit for digitally generating sawtooth waveform. An error amplifier circuit generates a divided down and error amplified alternator system voltage. A comparator circuit receives and compares to each other the digitally generated sawtooth waveform and the error amplified alternator system voltage. This comparator circuit has an output to produce an alternator field input signal used for driving the field of an alternator.

In another aspect of the present invention, the circuit for generating a digitally generated sawtooth waveform further comprises a digital-to-analog converter, a down counter having an output connected to the digital-to-analog converter, and a clock that inputs a clock signal to the down counter. The clock is operative to generate about 20 kHz clock signals to the down counter. The circuit for generating the pulse width modulated waveform, the error amplifier circuit and the comparator circuit can be monolithically formed as a single semiconductor circuit.

An n-bit latchable down counter can be operatively connected to the output of the comparator circuit. A stator prescaler circuit is operatively connected to the n-bit latchable counter. A digital comparator is operatively connected to the n-bit latchable down counter and operatively connected to the circuit that digitally generates a sawtooth waveform. A clock can be operatively connected to the stator prescaler and can produce about a 300 Hz clock signal through the stator prescaler. The stator prescaler is essentially two divide by n circuits controlled by a watchdog timer. When the WD timer does not detect that the stator signal is above 300 Hz, then the larger divide by n (e.g., 2n) is implemented to generate a stator frequency of f(stator)/2n at the clock input of the latchable down counter. If the WD timer detects a 300 Hz or greater signal, the faster divide by n (i.e., n) is used. This increases the rate of change in the incrementing of the field duty cycle at higher alternator rpms.

The n-bit latchable down counter can further comprise an 8-bit latchable down counter. In still another aspect of the present invention, the system regulates an alternator and comprises a circuit for digitally generating a sawtooth waveform. This circuit comprises a down counter having an output, a clock operatively connected to the down counter for driving the down counter, and a digital-to-analog converter connected to the output of the down counter.

An error amplifier circuit generates a divided down and error amplified alternator system voltage. A comparator receives and compares to each other the digitally generated sawtooth waveform and the error amplified alternator system voltage. This comparator has an output. A clock driven stator prescaler circuit has an n-bit latchable down counter operatively connected to the output of the comparator and the stator prescaler circuit. A digital comparator has an input connected to the n-bit latchable down counter and the output of the down counter for producing at a digital comparator output and alternator field driver input signals used for driving the field of an alternator.

In a method aspect of the present invention, the method comprises the step of generating a sawtooth waveform. The method also comprises the step of comparing the sawtooth waveform with a divided down and error amplified alternator system voltage to produce an alternator field input signal. The method also comprises the step of driving the field of an alternator with the alternator field input signal.

BRIEF DESCRIPTION OF THE DRAWINGS

Other objects, features and advantages of the present invention will become apparent from the detailed description of the invention which follows, when considered in light of the accompanying drawings in which:

FIGS. 7–11 are tables showing the function of the load response control with various states and the changing duty cycle.

DETAILED DESCRIPTION OF THE PREFERRED EMBODIMENTS

FIG. 5 illustrates a simplified block diagram of a charging system 100, such as used in an automobile circuit. The alternator is illustrated at 102 and is formed as a current mode machine that is controlled by sensing a voltage, as is well known to those skilled in the art. A regulator is illustrated at 104 and determines the amount of field current required by monitoring the voltage at the output of the alternator 102 at the B+ stud 106 corresponding to the battery connection. The regulator often is inside the alternator housing. The current is regulated by means of a pulse width modulated signal that typically has a frequency of about 200 to 400 Hz. The regulator 104 includes a ground terminal 108 and a field terminal 110 connected to the alternator 102 and its field terminal 111. The field rotates inside the alternator, as is well known to those skilled in the art, and includes the appropriate coils for the three stators as shown at 112, 114 and 116. Appropriate diodes 118 are also included in the alternator 102. The regulator 104 also includes a lamp terminal 120 that connects to a warning lamp 122. An ignition terminal 124 and battery terminal 126 connect to the ignition switch 128, as is well known to those skilled in the art. A SNS 130 terminal connects to the battery 132, which in turn connects to the B+stud 104 and ground. The vehicle load is shown at 134. A stator terminal 136 connects to stator terminal 138.

FIG. 5A illustrates the graph of the field current and field voltage.

Figure 6A:
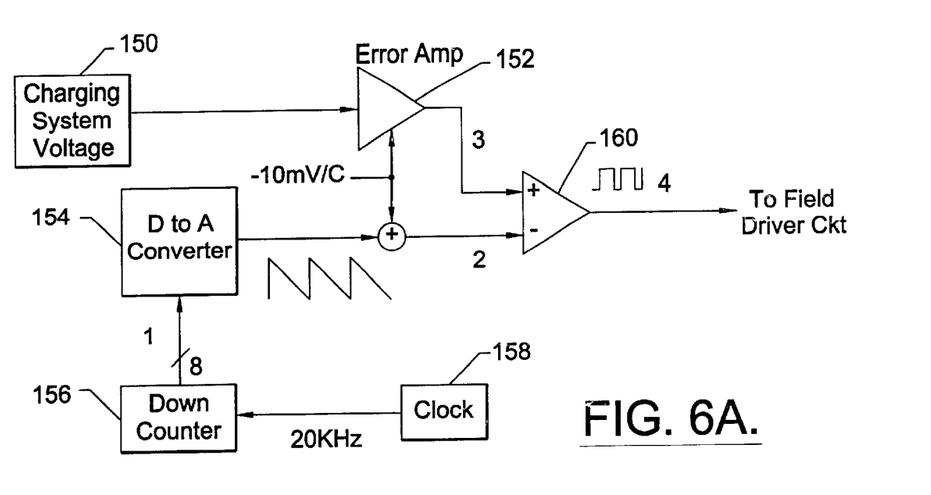
FIG. 6A is a schematic circuit diagram of the present invention showing one aspect using a digital-to-analog converter and down counter.

FIG. 6A illustrates a schematic circuit of the present invention where the charging system voltage 150 is input to an error amplifier circuit 152, such as formed from an error amplifier. The charging system voltage is divided down, such as by techniques known to those skilled in the art. A digital-to-analog converter 154 receives an input signal from a down counter 156, which in turn receives an input from a clock 158 that outputs a 20 kHz signal to the down counter. A digitally generated sawtooth waveform is generated from the digital-to-analog converter 154. This signal passes into an analog comparator 160 that also receives the signal from the error amplifier circuit 152. The error amplifier 152 is connected via a voltage summing circuit 162 and −10 mV/C connection as illustrated. FIG. 6C illustrates the output at points 2, 3 and 4 as located on the schematic circuit shown in FIG. 6A.

The simple digital-to-analog converter 154 and the free running down counter 156 used in the present invention are advantageous. The down counter 156 is driven by an all silicon or internal oscillator. This oscillator does not require any external capacitance. The down counter 156 provides a simple downward counting value of a preferred 8-bit word, labeled at 1, from 255 to 0 (256 steps) that is converted into an analog value forming a simple sawtooth waveform 2. The number of steps realized is 256 (the schematic drawing was simplified to illustrate the presence of steps).

The digitally manufactured waveform is then adjusted for temperature compensation and compared to the divided down and error amplified system voltage 3.

The comparison provides the input signal 4 needed to drive the field of an alternator. Through the alternator's mechanical gain, the system voltage is affected thereby closing the loop.

Figure 6B:
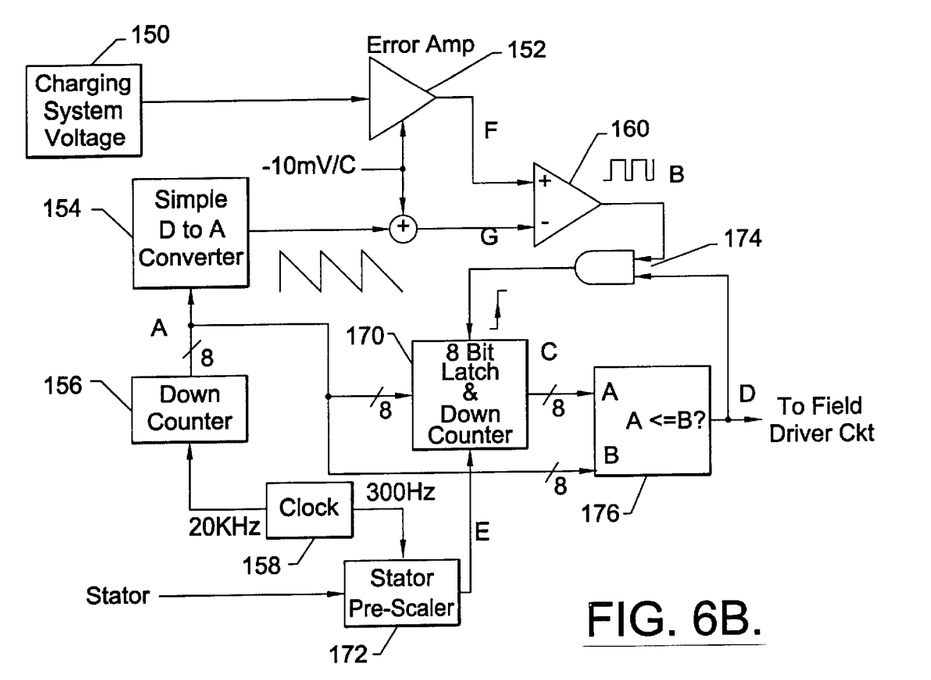
FIG. 6B is another schematic circuit diagram of the present invention showing a similar circuit of FIG. 6A, but also using a stator input with a latch down counter and digital comparator.
Figure 6C:
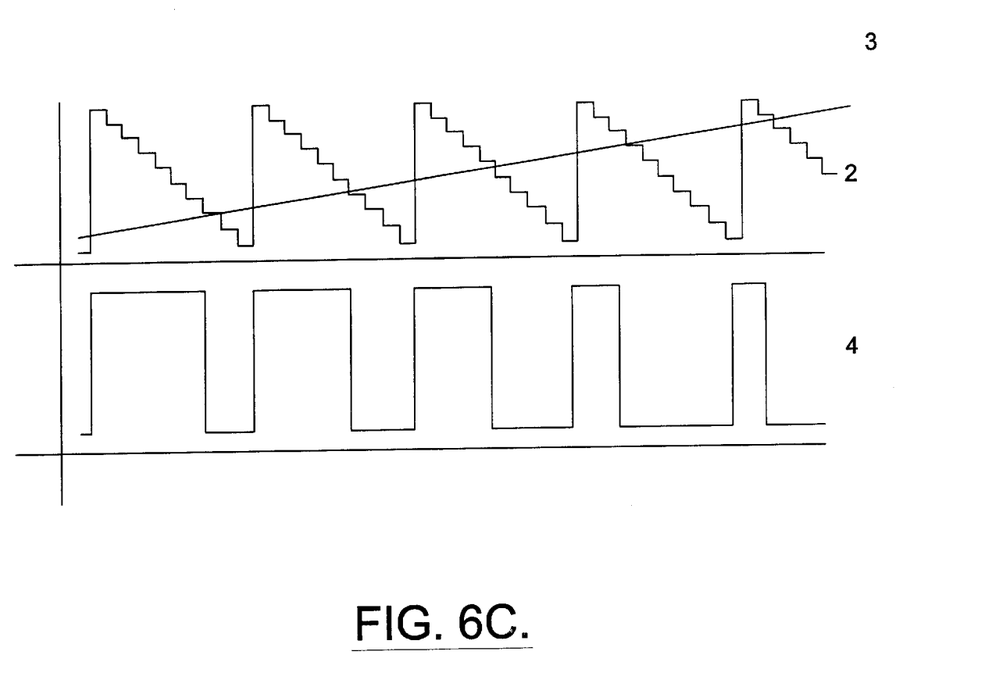
FIG. 6C is a graph showing the output at the various points of the schematics shown in FIG. 6A at points 2, 3 and 4.
Figure 7:
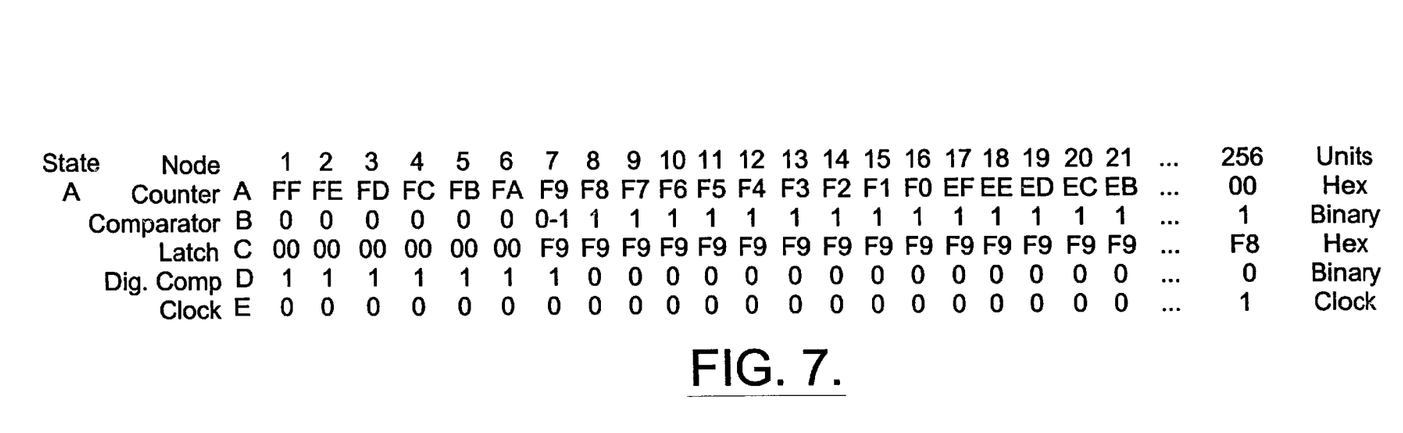

FIG. 6B illustrates a modified version of the circuit shown in FIG. 6A where a latchable down counter 170 and stator prescaler 172 are used. As illustrated, the output from the analog comparator 160 is then fed into a logic circuit 174. The clock 158 produces not only a clock signal for the down counter 156, but also can produce a 300 Hz clock signal for the stator prescaler 172 that receives an input from one of the stator coils 112, 114, 116. That signal is output at E and n-bit latch and down counter also referred to as an n-bit latchable down counter. In one aspect of the present invention, the n-bit latchable down counter 170 is formed as an 8-bit latchable down counter. The n-bit latchable down counter 170 also receives an input from the output of the down counter 156. A digital comparator 176 receives the output from the n-bit latchable down counter and the input from the down counter 170 at A and provides the output to the alternator. A feedback loop 178 of the output is fed into the logic circuit 174.

As noted before, typical digital alternator voltage regulator systems are infinite gain types where there is a threshold voltage compared to the system voltage. When the system voltage is above the threshold voltage, the field drive is off. Having the system voltage below the set point turns on the field drive.

The present invention provides a very stable waveform for alternator voltage regulation. The circuits can be designed in a semiconductor integrated circuit, such that the circuit components illustrated in FIG. 6B can be contained on one monolithically formed chip.

Most importantly in the present invention, the input to a field drive circuit is controlled via the 8-bit latchable down counter 170. The present invention forces a duty cycle by limiting the gain to about a 300 mV window generated by the digitally manufactured sawtooth waveform. This prevents the system from forcing a duty cycle frequency on the regulator, thus eliminating the potential for unstability at any specific loading. For purposes of description, signals in the various portions of the circuit are referred to by letters A–G.

Normal operation without the controlled rate of increase of the field driver circuit would drive the field directly from the output B that is inverted with the rate of increase control in place the field driver circuit is driven from D. The down counter output at A drives both the input latches of the 8 bit latchable down counter 170 and the simple digital-to-analog converter 154. The digital-to-analog converter converts the digital signal into a sawtooth waveform. That waveform is processed to incorporate a thermal compensation for optimum battery life. That voltage G is then compared in the analog comparator 160 to the error amplified measurement of the system voltage at F and produces a pulse width dependent signal B based on a small range of voltage around a central set point voltage.

On the rising edge of the signal at B, if the value of the 8-bit latchable down counter C is less than or equal to the down counter value A, then the value of the down counter 156 is latched into the latchable down counter 170.

When the loading on the system changes and the system voltage drops from previous steady state values, the error amplifier output F falls below the digitally manufactured sawtooth waveform G earlier in the cycle. At that point, the comparator output B rises to a digital "1". At this point, the digital comparator output D is a digital "0" because the down counter value has already dropped below the previously latched latchable down counter value such that A<=B is false. This prevents an increase in load from directly affecting the field duty cycle/current.

The increase in duty cycle or field current is then accomplished by decrementing the latchable down counter by means of a clock signal. This signal can be asynchronous or in sync with the sawtooth waveform. This method uses a scaled or divided down version of the stator frequency to determine the rate of increase of the field duty cycle.

When unloading the system, the system voltage will rise above previous values causing B to rise in the sawtooth comparison cycle sooner than when the digital comparator changes from true to false. Because this event occurs before D falls to a digital "0", the latchable down counter is latched to the current value of the down counter output.

In alternative embodiments, it is possible to clock the latchable down counter by means of a fixed frequency (e.g., 51.2 Hz signal for a 2.5 s delay from 0% duty cycle to full field). Another option is to provide a frequency at which the stator scale factor is reduced to increase the rate of decrease of the scalable down counter effectively increasing the duty cycle during increasing loads even faster at higher alternator RPMs. Another option is to compare the stator to a fixed frequency threshold to increase the fixed synchronous decrementing of the scalable down counter, thus providing two levels of duty cycle increasing rates.

FIGS. 7–11 show the different scenario outputs for the function of the load response control in a fixed gain type control loop. The field driver is no longer driven from the analog comparator, but from the digital comparator. In state A shown in FIG. 7, the duty cycle requested is 2.73% (7/256). The transition from state A to B is an increase load desiring to move to a 3.125% duty cycle.

Figure 8:
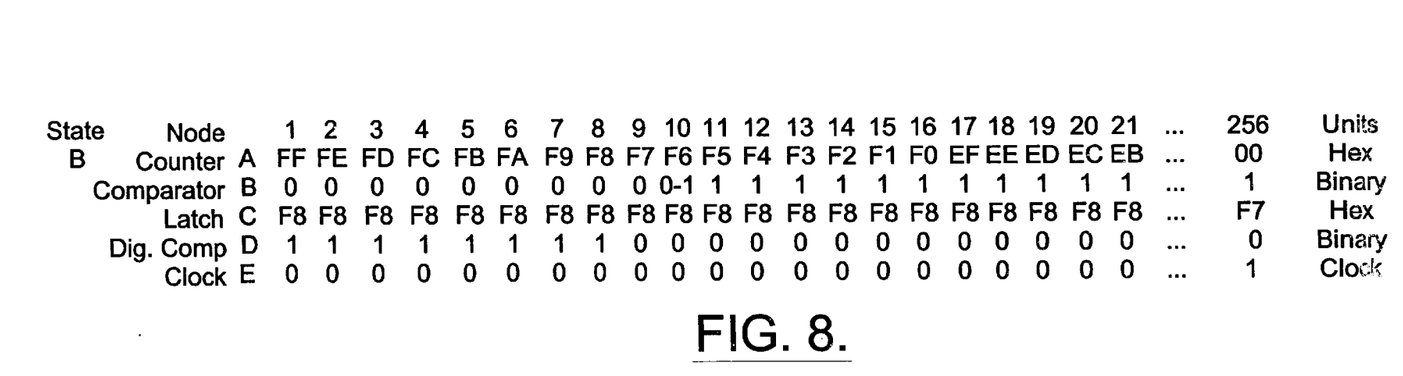

In FIG. 8, state B has the digital comparator output falling before the analog comparator rises. This occurs because the system is asking for a duty cycle larger than what was previously in use. In this case, the digital comparator shuts off the field driver before the analog comparator is said to shut off.

In FIG. 9, are shown states C and D. Even though the clock is shown synchronous with the zero crossing of the down counter, it may be asynchronous to the down counter. This asynchronicity will add some minor dither to the duty cycle seen on the field.

In state E shown in FIG. 10, when the steady state is reached, the latch outputs will dither between two values.

Finally in state F shown in FIG. 11, the system voltages requests a lower duty cycle than previously used. Here the new, lower duty cycle is implemented.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A system for regulating an alternator comprising:
   a digital-to-analog converter for digitally generating a sawtooth waveform, a down counter having an output connected to said digital-to-analog converter, and a clock that inputs a clock signal to the down counter;

an error amplifier circuit for generating a divided down and error amplified alternator system voltage;

a voltage summing circuit operatively connected to said digital-to-analog converter and error amplifier circuit; and a comparator circuit operatively connected to said voltage summing circuit and said error amplifier circuit for receiving and comparing to each other the digitally generated sawtooth waveform and the error amplified alternator system voltage and having an output to produce an alternator field input signal used for driving the field of an alternator.

2. A system according to claim 1, wherein said clock is operative to generate about 20 kHz clock signals to said down counter.

3. A system according to claim 1, wherein said circuit for digitally generating a sawtooth waveform, said error amplifier circuit, and said comparator circuit are monolithically formed as a single semiconductor circuit.

4. A system according to claim 1, and further comprising an n-bit latchable down counter operatively connected to said output of said comparator circuit, and a stator prescaler circuit operatively connected to said n-bit latchable down counter.

5. A system according to claim 4, and further comprising a digital comparator operatively connected to said n-bit latchable down counter and operatively connected to said circuit for digitally generating a sawtooth waveform.

6. A system according to claim 4, and further comprising a clock operatively connected to said stator prescaler.

7. A system according to claim 6, wherein said clock is operative to produce about a 300 Hz clock signal to said stator prescaler.

8. A system according to claim 4, wherein said n-bit latchable down counter further comprises an 8-bit latchable down counter.

9. A system for regulating an alternator comprising:

a digital-to-analog converter circuit for digitally generating a sawtooth waveform, said circuit comprising a down counter having an output, a clock operatively connected to said down counter for driving said down counter, and a digital-to-analog converter connected to said output of said down counter;

an error amplifier circuit for generating a divided down and error amplified alternator system voltage;

a voltage summing circuit operatively connected to said digital-to-analog converter and error amplifier circuit;

a comparator operatively connected to said voltage summing circuit and error amplifier circuit for receiving and comparing to each other the digitally generated sawtooth waveform and the error amplified alternator system voltage and having an output;

a clock driven stator prescaler circuit;

an n bit latchable down counter operatively connected to said output of said comparator and said stator pre-scaler circuit; and a digital comparator having an input connected to said n bit latchable down counter and said output of said down counter for producing at a digital comparator output an alternator field input signal used for driving the field of an alternator.

10. A system according to claim 9, wherein said n bit latchable down counter comprises an 8 bit latchable down counter.

11. A system according to claim 9, and further comprising a clock having a 300 hertz clock signal to said stator prescaler circuit.

12. A system according to claim 9, wherein said clock operatively connected to said down counter is operative to generate about 20 kHz clock signals.

13. A system according to claim 9, wherein said circuit for digitally generating a sawtooth waveform, said error amplifier circuit, said comparator, said clock driven prescaler circuit, said n-bit latchable down counter, and said digital comparator are monolithically formed as a single semiconductor circuit.

14. A system according to claim 9, and further a logic gate for receiving the output of said comparator and a feedback loop of said alternator field input signal.

15. A method of regulating an alternator comprising the steps of:

digitally generating a sawtooth waveform by a digital-to-analog converter connected to a down converter and summing circuit, which is connected to an error amplifier;

comparing the digitally generated sawtooth waveform received from the summing circuit in an analog comparator connected to the summing circuit and the error amplifier with a divided down and error amplified alternator system voltage to produce an alternator field input signal; and driving the field of an alternator with the alternator field input signal.

16. A method according to claim 15, and further comprising the step of digitally generating the sawtooth waveform within a digital-to-analog converter that is controlled by a down counter and clock signal produced by a clock.

17. A method according to claim 16, wherein said clock is operative for producing about 20 kHz clock signals to said down counter.

18. A method according to claim 16, and further comprising the step of providing the digital-to-analog converter, down counter and clock as a monolithically formed semiconductor circuit.

19. A method according to claim 16, and further comprising the step of providing a downward counting value from 255 to 0.

20. A method according to claim 15, and further comprising the step of turning on the field drive by a system voltage that is below a set point.

* * * * *